Oct. 2, 1951  A. FAVRE  2,569,983
AIRCRAFT WING FLAP WITH A LEADING EDGE ROLLER
Filed Dec. 22, 1945  8 Sheets-Sheet 1

Inventor
ALEXANDRE FAVRE
By Haseltine, Lake & Co.
Attorneys

Oct. 2, 1951 A. FAVRE 2,569,983
AIRCRAFT WING FLAP WITH A LEADING EDGE ROLLER
Filed Dec. 22, 1945 8 Sheets-Sheet 2

Inventor
ALEXANDRE FAVRE
By
Haseltine, Lake & Co.
Attorneys

Oct. 2, 1951  A. FAVRE  2,569,983
AIRCRAFT WING FLAP WITH A LEADING EDGE ROLLER
Filed Dec. 22, 1945  8 Sheets-Sheet 3

INVENTOR
ALEXANDER FAVRE
By: Haseltine, Lake & Co.
AGENTS

Oct. 2, 1951 — A. FAVRE — 2,569,983
AIRCRAFT WING FLAP WITH A LEADING EDGE ROLLER
Filed Dec. 22, 1945 — 8 Sheets-Sheet 4

Inventor
ALEXANDRE FAVRE
By Haseltine, Lake & Co.
Attorneys

Inventor
ALEXANDRE FAVRE
By
Haseltine, Lake & Co.
Attorneys

Oct. 2, 1951 A. FAVRE 2,569,983
AIRCRAFT WING FLAP WITH A LEADING EDGE ROLLER
Filed Dec. 22, 1945 8 Sheets-Sheet 6

INVENTOR
ALEXANDER FAVRE
By
*Haseltine, Lake + Co.*
AGENTS

Inventor
ALEXANDRE FAVRE
By Heseltine, Lake & Co.
Attorneys

Patented Oct. 2, 1951

2,569,983

UNITED STATES PATENT OFFICE 2,569,983

AIRCRAFT WING FLAP WITH A LEADING EDGE ROLLER

Alexandre Favre, Marseille, France, assignor, by mesne assignments, to Office National d'Etudes et de Recherches Aéronautiques (O. N. E. R. A.), Paris, France Application December 22, 1945, Serial No. 636,614 In France January 19, 1943

Section 1, Public Law 690, August 8, 1946 Patent expires January 19, 1963

2 Claims. (Cl. 244—42)

It is well known that in the relative displacement of a solid and any desired fluid the viscosity of the latter generates friction and vortices which result, in the case of a liquid or gaseous fluid flowing through a duct or a channel, in a loss of head where the solid is moved with respect to the liquid or gaseous fluid, or in an increase in the resistance opposed by the solid to the motion of the fluid where the latter is displaced, or in an increase in the resistance to the progress of the solid in the fluid where the former is moved.

Researches by the applicant have shown that it is possible to cancel the effects of the viscosity of the fluid by covering the surface of contact between the solid and the fluid with a movable wall displaced in the direction of the flow with a sufficiently high speed, the effect of which is to annihilate the friction between the fluid and the wall, to compel the fluid to remain adherent to the surface of the solid irrespective of the curvature of the latter, to do away with shedding effects that will generate eddies carried along by the solid in its relative movement, and to avoid the production of vortices.

Starting from that principle, this invention has for its object a very simple device whereby the relative displacement of a solid and a fluid is very materially facilitated and according to which those portions where the continuousness of the surface of the solid is broken, or those points where surfaces of the solid are transitioned by extremely curved elements, are fitted with solids of revolution (or rolls) whose axes are substantially normal to the direction of flow and which are kept in rotation with a sufficient speed about said axes.

Preferably, the surface down the roll is slightly secant to the roll which is embedded between the surfaces up and down the same respectively so that only those generatrices whose peripheral speed lies in the direction of the stream shall be in contact with the fluid. In their simples form the rolls are cylinders of revolution. Advantageously, the down surface is slightly concave adjacent to the roll, for the purpose of causing the fluid to stick to said surface as it leaves the roll. Said rolls can be combined with slots as will be more clearly explained hereafter.

Various possibilities of application are shown in the drawing appended hereto for a better understanding of this invention.

Figure 1:
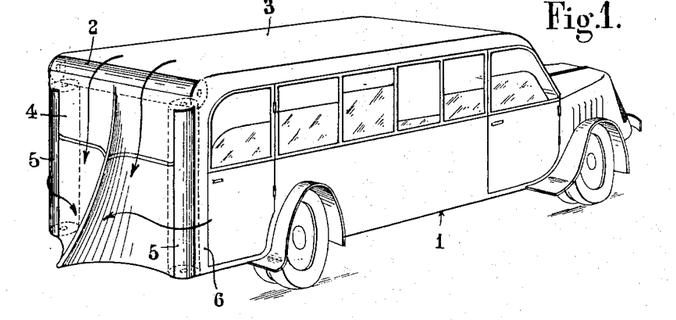
Figures 1, 2 and 3 are a perspective, a side and a rear elevational view respectively of an automobile equipped according to this invention.
Figure 2:
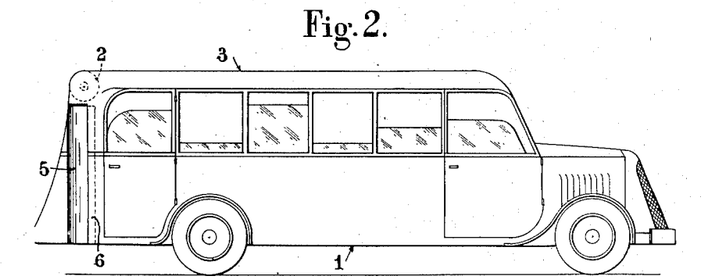
Figure 3:
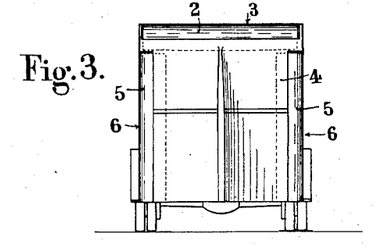

The automobile shown in Figs. 1 to 3 comprises a body 1 of box-like shape which, amongst other advantages such as simplicity in construction, is the most advantageous as far as the utilisation of the interior space is concerned, a roll 2 arranged at the transition between the roof 3 and the rear panel 4, and a pair of rolls 5 arranged at the junction between the side panels 6 and the rear panel 4. Contingently, slots collect air in overpressure areas and open between the leading surfaces and the rolls.

Figure 4:
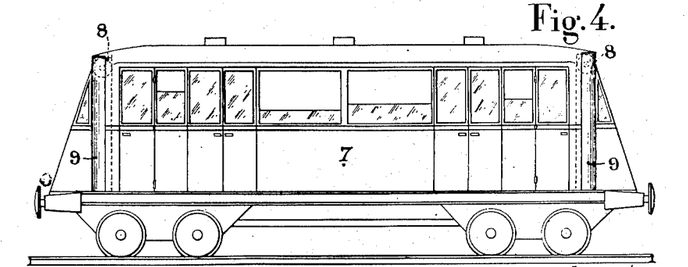
Figures 4, 5 and 6 are a side, a rear and a top plan view respectively of a rail motor car equipped according to this invention.
Figures 5, 6:
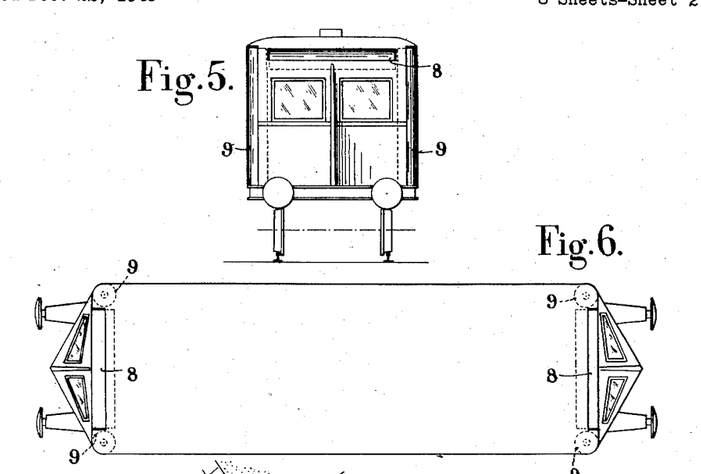

Similarly, the rail motor car shown in Figs. 4 to 6 comprises a substantially box-like body 7, rolls 8 and 9 and contingently slots similar to those aforementioned.

The rolls as a whole are driven mechanically, e. g. by connection with the axles of the vehicle, the speed ratio between the wheels and the rolls being such that the peripheral speed of the latter be a suitable multiple or fraction of the vehicle running speed. The rolls can be driven in any other suitable manner, e. g. by the vehicle engine, or by separate motors. Contingently, the cylindric rolls can be substituted by solids of revolution having other than straight generatrices. Finally, it may be advantageous to give a slightly curved shape to the front and rear walls of the body instead of providing flat walls normal to the direction of travel; thus, the rear wall is preferably concave, as shown in the drawing. Other arrangements can be conceived, wherein e. g. a roll is provided also at the bottom edge of the body; besides, a greater number of rolls providing an approximately polygonal outline can also be resorted to, for the purpose of securing an easier transition between the rolls; instead, the number of rolls can be as low as one, when guide fins can be arranged at the ends of the same.

Figure 7:
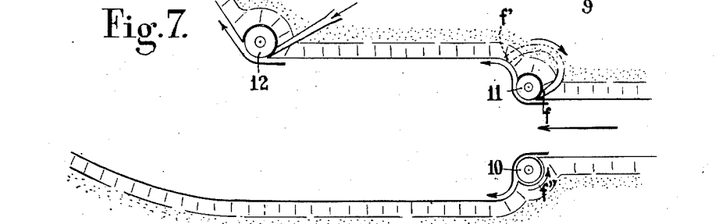
Figures 7 and 8 are a plan and a perspective view respectively of a channel equipped according to the invention.
Figures 8, 9:
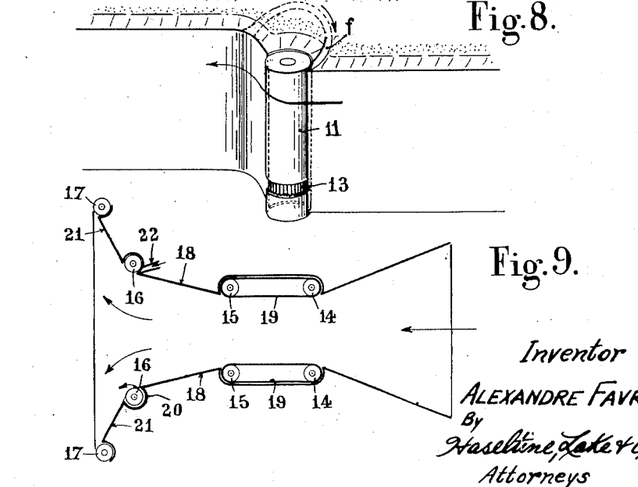
Figure 9 is a diagrammatic horizontal longitudinal sectional view of a diffuser devised according to the invention.

In order to avoid head losses resulting mainly from abrupt changes in direction or in section in a duct or a channel as shown in Figs. 7 and 8, rolls embedded in the wall of the duct are arranged principally at the reentrant angles of the channel, that is on the inner wall of the bends 10, 11, 12, or at the points of abrupt widening of the section, but also at those points where the latter is restricted, said rolls being given a suitable rotational speed either by auxiliary prime movers or by the flow of the fluid itself in the duct or channel. In the latter event, either the base of the roll or any suitable section 13 taken at a height which is immersed at all times in the liquid is provided with a set of blades which can be arranged between guide-discs.

Since the mean peripheral speed of the blades is slightly lower than that of the flow, and the roll is wholly effective only provided its peripheral speed bears a definite ratio to that of the flow and generally is higher than the latter, it is frequently necessary to provide the blades in a restricted section of the roll.

Besides, auxiliary blading can be arranged apart from the rolls to actuate the latter mechanically. In both cases the peripheral speed of the effective portions of the roll must remain a suitably selected multiple or fraction of the speed of flow of the fluid.

Slots $f$ can be provided ahead of the rolls and connected with intakes located in areas of overpressure $f'$; or else the same result can be attained simply as a consequence of the fluid being driven upstreams by the roll itself through the clearance $f''$ between said roll 10 and the wall.

The effect of rolls arranged according to this invention is not only to decrease head losses but also to regularize the flow and to improve the distribution of the fluid following such abrupt widenings in section as have to be accepted in certain dam or turbine-feeding works, from not being able to have sufficiently long water-supply channels in certain parts of their courses.

The application of this invention to ducts and channels finds its natural extension in diffusers, whereby it becomes possible to attain an efficiency close to 100%; in addition, it allows to admit discontinuousness in the flare, in order to arrive at any desired large angle of aperture, and to let e. g. the delivery duct of the machine open into a large room where the fluid is nearly speedless; it is only necessary to arrange rolls, contingently combined with slots, at the outlet of a short diffuser, along the edges where the angle of aperture changes abruptly, or even along the lines of transition between said diffuser and the room; and it is thus possible to shorten such a diffuser considerably and even completely to dispense with the delivery duct by designing the diffuser with an angle of aperture up to 360°.

Thus, the diffuser shown in Fig. 9 is equipped with rolls 14, 15, 16 and 17 driven by any suitable means, and the delivery duct 18 is shortened very materially as a result of the provision of rolls 16, 17 or even 15.

Moreover, the provision of a wall movable as a whole meets with no difficulty as far as a plane rectangular wall is concerned. A belt of any desired material, be it a compact one or simply a thin fabric, run about the rolls and led back at the other side of the wall will allow to provide on the whole surface a movable wall running at constant speed. A wind tunnel or a water channel can advantageously be complemented according to the invention by the provision of movable walls so designed on the faces of the test room or on panels, which makes it possible to instal models with a longer span and a very high effective span-chord ratio, since the speed of the stream is no longer interfered with by the wall effect. In addition, the efficiency of the blower will be increased by the suppression of friction in the test room.

As already mentioned, the rolls arranged according to this invention can be associated with slots whose purpose is to feed air to the leading portion of the movable wall; said slots are fed with fluid at a pressure higher than that prevailing in front of the roll; in the case of a diffuser air can be taken from the outside of the blower either at the normal or at a different pressure, as shown at 22; it can also be taken from the inside of the blower in an area of overpressure, or simply driven in by the roll itself through the clearance between the latter and wall 21, as shown at 20 in Fig. 9.

Most of the known lift-increasing arrangements create, at the same time as an increase in the lift, a considerable and correlative increase in the drag, which limits the use of the same to those cases where the travelling speed can or must remain comparatively low, such as in alighting or cruising conditions, whereas where high gliding or acceleration qualities are required the braking effect set up thereby excludes the use thereof.

The drag increase which accompanies the deflection of the lift-increasing flaps on an airplane and also the limitation of the lift are due mainly to shedding effects that take place on the top side of the wing or the flap as soon as the angle of incidence exceeds a definite value; although known additional provisions such as slots, blowing or sucking off the boundary layer, etc., may delay the said effects, they are unable to suppress them completely up to acceptable deflections. For the same reason, where the incidence reaches considerable values, the lift-increasing flaps can be provided only at the trailing portion of the wing, and their chord cannot exceed a definite percentage of the wing chord in the section considered.

According to this invention, it has been found that results nearly as satisfactory as those obtained with a wing having a completely movable top wall can be obtained in a very simple and practicable manner by applying a movable top wall only to the lift-increasing flaps instead of the wing as a whole, said provision being associated, if desired, with a slot between the wing and the flap, or any like contrivance; in fact, the said provision of a flap with a movable top wall eliminates shedding and increases the lift without substantially increasing the drag, or even lessening the same, irrespective of the deflection and the chord of the flap.

Consequently, a wing equipped with a lift-increasing device according to this invention comprises a front portion, which can be limited to the leading edge or can extend over a larger portion of the wing chord, and a flap extending rearwards over a greater or less percentage of the wing chord, swingably mounted about a fixed or movable axis suitably located if necessary to create a slot effect between the wing and the flap, which flap has a roll arranged in its leading edge, to which a rotary motion is imparted about the axis thereof by any suitable means such as the airplane engine, or an exhaust gas turbine, or auxiliary prime movers, or which can run idle, and about which an endless belt is run that can be made of compact material or of thin fluid-tight or permeable fabric, which belt bears on the top side of the flap, passes into the inside of the latter over a roll mounted for free motion about its axis and contigently over a stretching roll and comes back through the inside of the flap to the driving front roll.

Any suitable means can be used to obtain an increase in the speed of the flap movable wall as the deflection of the movable flap increases. Effectively, it is necessary for avoiding shedding that the speed of the belt should be the higher as the flap is deflected by a wider angle. This however is a provision which is by no means indispensable, and it can be contemplated to allow the belt to run at a higher speed than that sufficient in small incidence conditions.

It has also been found, according to this invention, that an almost equally good result can be attained from the viewpoint of shedding by dispensing with the belt and limiting the movable wall to the surface of the driving roll arranged in the flap leading edge where the wing surface has an abrupt transition with that of the flap in the deflected position of the latter. The motion of the roll, which then can become a surface of revolution having any suitable generatrix, is sufficient to remove the cause of shedding of the air flow, which then follows the outline altered by the deflection of the flap and sticks to the top side of the latter provided said outline is suitably selected.

From that point of view it is advantageous that the surface of the flap top side be slightly secant instead of tangent to the roll, and that its shape adjacent to the same be rectilinear or slightly concave. Of course, the other rolls over which the belt would have had to be guided or tensioned are done away with in this embodiment of the invention. This avoids the presence of rolls of smaller diameter running consequently at higher speed, as well as the presence of the belt.

In a modification of the invention the axis of the flap is offset, or movable, particularly for the purpose of allowing the flap leading edge to project slightly beyond the wing top side.

Where a simple leading edge roll is insufficient, a movable wall can be arranged to run over a pair of comparatively closely spaced rolls and consequently extending over a comparatively small fraction of the flap chord from the leading edge thereof, which movable wall can be exposed not only at the top side but also at the bottom side. The wing proper can extend in a shield whereby, at small flap incidences, the movable bottom wall is covered in such manner that the latter becomes exposed only beyond the angle at which the zero-speed point is shifted back past the movable bottom wall.

Figure 10:
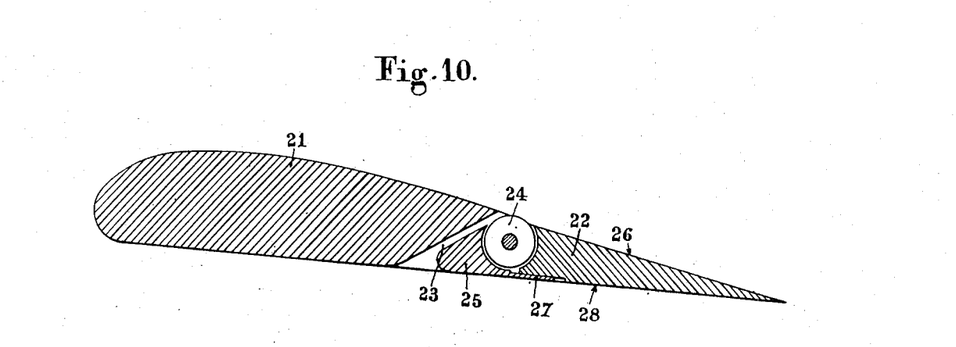
Figure 10 is a cross sectional view of an airplane wing equipped with a lift-increasing flap.
Figure 11:
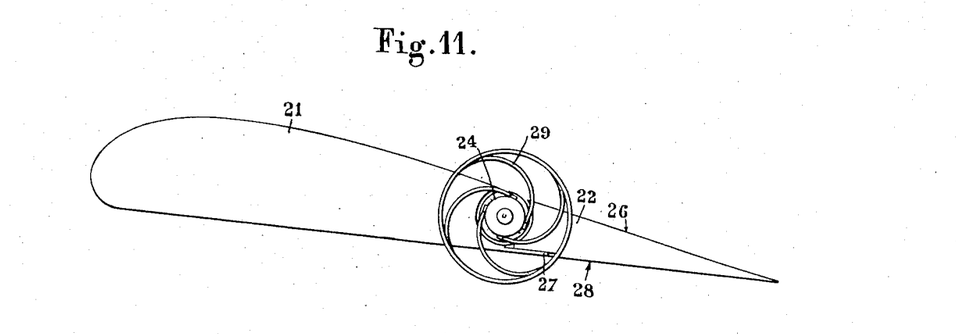
Figure 11 is a cross elevational view of the same air-plane wing.

A wing according to this invention is shown by way of indication and by no means of limitation in Figs. 10 and 11.

The wing shown comprises a front portion 21 of the conventional pattern and a lift-increasing flap 22, contingently with a slot 23 therebetween; the upper leading edge of the flap 22 consists in a roll 24 rotated about the axis thereof by any suitable means. According to Fig. 11 this rotational movement is effected by a vane carrying member 29 secured to the end of the cylinder exteriorly of the wing tip and actuated by the relative translational movement of the atmospheric air. Contingently, a fixed shield 25 provides a front extension of the lower side of the lift-increasing flap so that only the upper generatrices of roll 24, which travel in the desired direction, are in contact with the fluid; it can extend rearwards in a flexible yielding or sliding wall 27 which provides for the transition with the flap bottom surface 28 even when said flap is strongly deflected; the top face 26 of the flap is very slightly secant to roll 24; it is flat or slightly concave.

Where a fixed wall is arranged at the end of a movable wall, e. g. at right angles thereto, an eddy escapes at the joint between the movable wall and the stationary wall whereby power is wasted.

In order to avoid such disadvantage, the fixed wall is arranged at right angles to the movable wall and its portion adjacent to the joint is replaced by a movable portion moved in the same direction as the movable wall.

Thus, where the movable wall is a rotor, a disc having a larger diameter than the same is secured at the end thereof, which disc extends in and provides a portion of the orthogonal wall; it may be advantageous progressively to transition said disc with the rotor by means of a fillet that can have e. g. a circular outline; said disc can be separate from the rotor and have a different rotational speed; that portion of the disc which meets a fluid stream flowing in the reverse direction is concealed in a cowling, the same as the corresponding portion of the rotor.

The invention also covers means to provide the transitions between adjacent movable walls, e. g. to provide one or several intermediate bearings for the rotors or to obtain a change in the position or the direction of the axes without involving shedding effects that cause losses of power and lower efficiency.

Of course, it would be possible for that purpose to use the arrangement just described, i. e. to arrange rotary cheeks at the ends of the rotors and partially orthogonal fixed walls or guide-plates.

However, where there is a disadvantage in the use of such an arrangement, e. g. owing to the dimensions of and to the drag created by said guide-plates and discs, it is possible to do away with shedding effects by limiting the width of the interruption in the movable wall and contingently by increasing the speed of the movable walls.

With a view to limit the width of the interruption in the movable wall same can be reduced to the minimum just necessary to provide the passage of the bearing supports and the various related parts, inclusive of the minimum clearance for avoiding contact; for that purpose, contingently, rotors can be used whose axes extend in slightly different directions, to provide for the passage of the supports and fittings at the convex side, while the width of the interruption of the movable walls is reduced at the useful concave side, or even brought down to nil by allowing the rotors to penetrate each other; a continuous outline can also be obtained by the provision of a fixed wall portion in the useful zone between the movable walls; besides, leakage between the walls can be reduced by the provision, at the inside of the rotors, of baffles, labyrinths, fluid-tightening members or the like, and contingently, at the outside, of butt straps which have the important additional advantage of cancelling the radial component of the leaks.

Figures 12, 13:
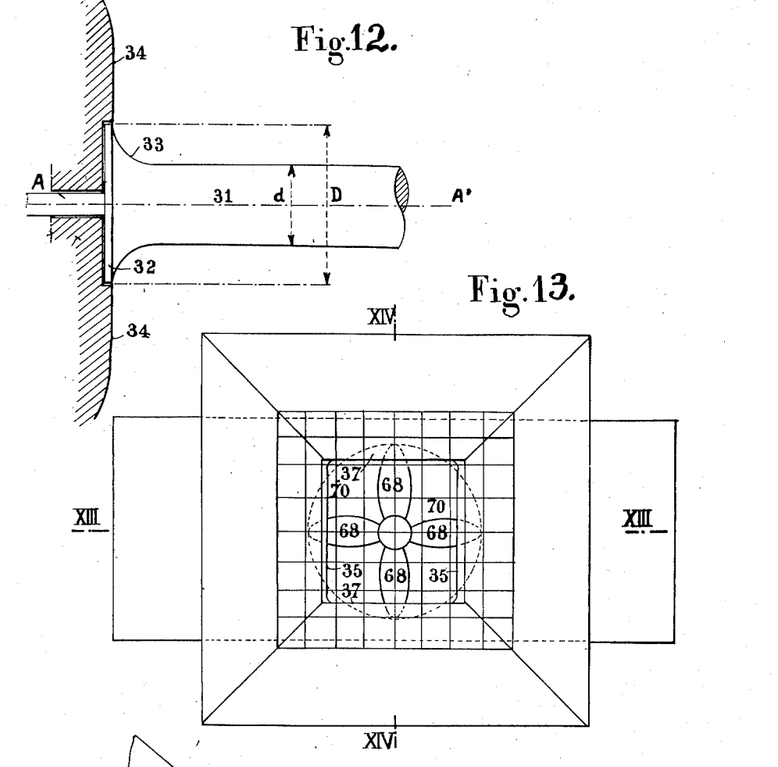
Figure 12 illustrates a roll or rotor adjacent to a non-rotary wall at right angles to the axis of the same.
Figure 13 is a front view of a wind-tunnel.

The arrangement shown in Fig. 12 comprises a rotor 31 having AA' for its axis and a diameter $d$ that may vary lengthwise of said axis, a disc 32 with a diameter D, transitioned with the rotor by a fillet 33 having e. g. a circular outline, and a stationary wall 34, extending at right angles to axis AA' at least adjacent to the fillet, in which the disc 32 is sunk.

Such an arrangement can be applied wherever a whole movable wall, or a movable wall limited to one or several rotors, is employed, or where same is followed by a stationary wall.

It can also be applied where shedding or turbulence is to be avoided opposite an interruption in the movable wall, necessitated e. g. by an intermediate support for the rotors. In that event, a guide plate can be arranged sidewise of said interruption, the transition between the rotors and the wall then being effected according to this arrangement.

Thus, such an arrangement can be used in diffusers generally and in wind tunnel diffusers in particular.

In order to make the construction easier it may be advantageous, instead of providing rotors at the whole periphery of the section where the wide angle of flare begins, to limit the number of rotors e. g. to one pair of the same. Thus, such an application is possible in a wind-tunnel having a rectangular or substantially rectangular section (Figs. 13, 14 and 15) by means of two rotors 35 arranged opposite each other and after which the walls 36 diverge by a wide angle. The two other stationary walls 37 have a small or even a negative angle of aperture, and the rotors are transitioned with said stationary walls by means of the aforementioned rotary discs 38.

These arrangements are applicable to all kinds of wind-tunnels, blowers, ducts, diffusers, compressor diffusers, etc., and notably to an open channel whose abruptly flaring portion is arranged as described with reference to Fig. 8.

At least at the immersed end of rotor 39 (Fig. 16) a cheek 40 transitioned by a fillet partakes in the rotation of said rotor and is transitioned on the other hand with the fixed bottom wall 41 in order to avoid the emission of an end eddy.

Figure 16:
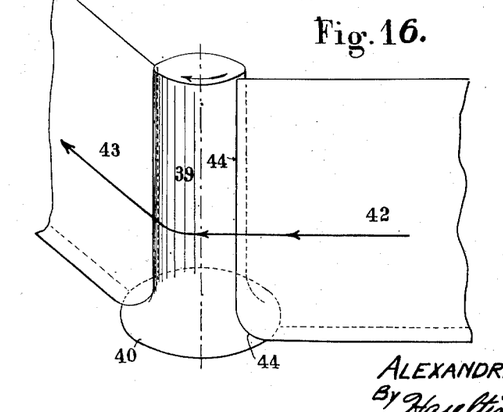
Figure 16 is a perspective view of a vertical rotor arranged at the edge between two fixed walls intersecting each other.

The shape of the fixed vertical walls 42 and 43 matches that of the rotor and, as far as 42 is concerned, allows the slot 44 to deliver onto the rotor and the rotary disc.

The invention is also applicable to road and rail motor cars, as far as the transition between the rotor or rotors and the fixed walls provided at the ends thereof is concerned.

For instance, the number of rotors can be reduced to one and same can be arranged at the rear top end of the vehicle at 45 (Fig. 17) between the fixed cheeks or guide-plates 46. The rotor 45 is transitioned with plates 46 in the aforesaid manner, that is, by rotary discs 47 progressively transitioned.

Contingently, where necessary, one or several bearings can be contemplated for the rotor, and one or several intermediate guide-plates with rotary fillets provided.

Such arrangements can be employed on all kinds of vehicles, surface ships or submarines, flying boat hulls and floats, etc.

Figures 17, 18:
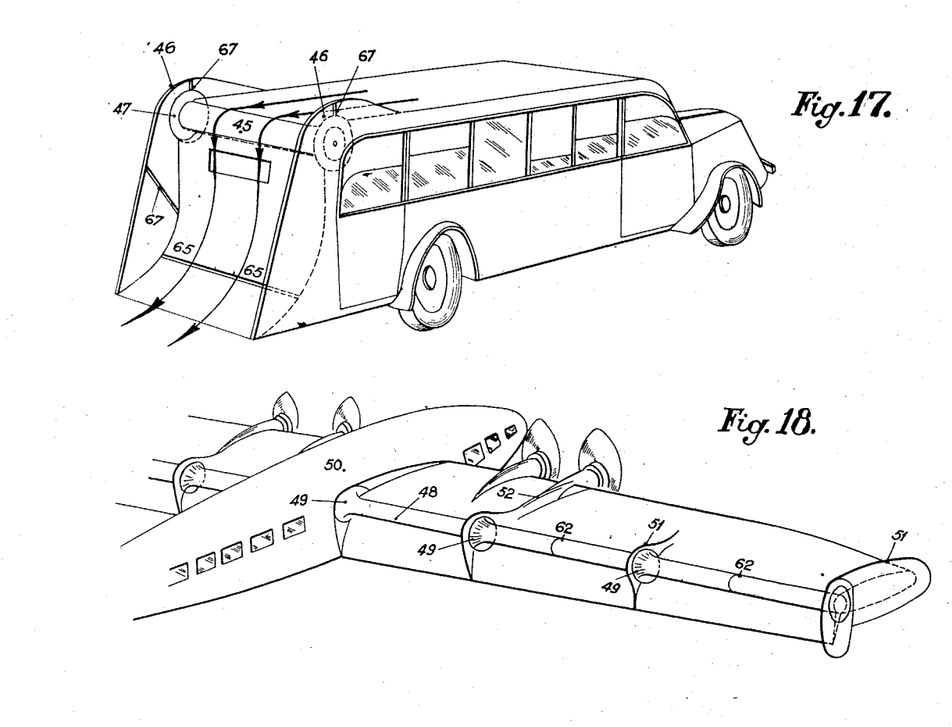
Figure 17 illustrates a vehicle fitted with a rotor arranged at the edge between its top and its rear wall.
Figure 18 illustrates an airplane equipped with a rotor arranged in the axis of the hinge between a wing and a lift-increasing flap.

Other applications to be mentioned are also such as lift-generating devices: wings, flaps, ailerons, controls, deflectors, ship and submarine rudders, sails, etc., and particularly airplane lift-increasing flaps; the movable wall rotors 48 are transitioned through discs 49 with the fuselage 50, the end or intermediate guide-plates 51, the engine fairing 52 and all such stationary walls (Fig. 18).

Figure 19:
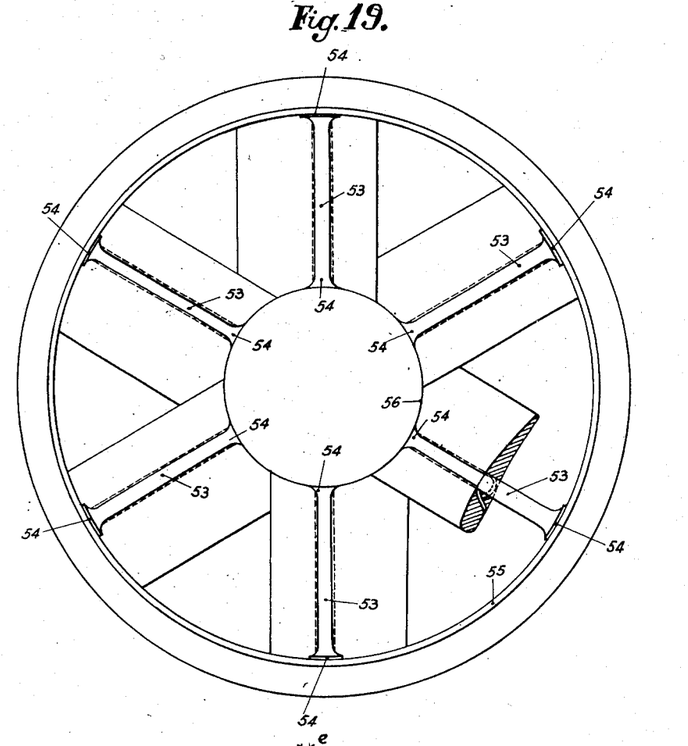
Figure 19 is a front view of a turbine whose blades are equipped with rotors.

The said arrangement can also be used in turbo-machines, notably for the purpose of transitioning the rotors 53 through discs 54 with the fixed end walls 55 or with the end or intermediate guide-plates or with the fixed walls of the spinner 56 (Fig. 19).

Where a transition must be provided for between adjacent movable walls, for instance in order to arrange one or several intermediate bearings for the rotors, or to obtain a change in the direction or the position of the axes, the consequence of the movable wall being interrupted by stationary walls is that the friction on the latter may be the cause of shedding effects and create a vortex which not only will propagate below the fixed wall but even can widen considerably and interfere with a substantial portion of the flow.

Such vortices will appear where the stationary wall is too wide to allow the corresponding air slice to be carried along by the surrounding fluid (for instance, in the case of an aerofoil model provided with a 32 mm. rotor in a stream flowing at about 10 m./sec., where the fixed walls are wider than 2 mm.).

Such shedding can be checked by limiting the width of the interruption in the movable wall and contingently by increasing the speed of the adjacent movable walls.

However, the contingent influence of the clearance between the rotors and the stationary walls must also be accounted for, which influence may result in considerable leakage having a component at right angles to the axis of the rotor; said leaks will interfere with the flow and can be the cause of shedding effects; as a consequence, it is necessary contingently to lessen them to a minimum and to annihilate the radial component.

Figure 20:
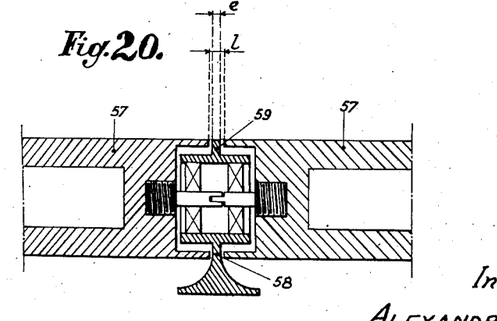
Figures 20 to 22 are longitudinal sectional views of connecting means arranged between rotors arranged end to end.
Figure 21:
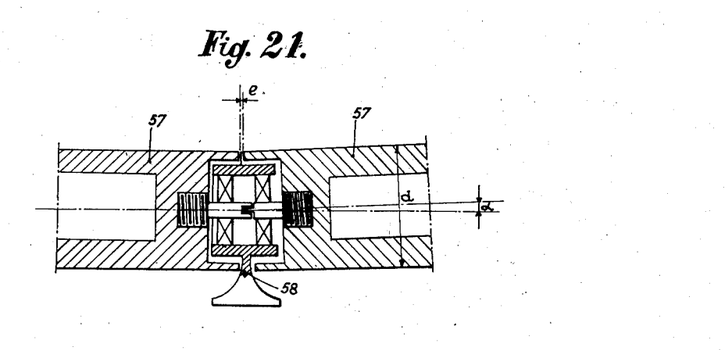

In addition to the eventual increase in the speed of the wall, the following expedients can be adopted in order to avoid shedding sidewise of such joints between movable walls:

The interval $l$ must be provided between the two adjacent rotors 57 illustrated in Fig. 20 for the passage of the various supplementary bearing brackets 58 which are arranged within the rotors together with the driving gear as a whole; in the effective area of the rotors a fixed wall 59 having a thickness $e$ is provided in said interval $l$ whereby only two narrow spaces, whose breadth is $\frac{1}{2}$ $(l-e)$, are left in order to avoid contact.

While retaining the said interval $l$ between the two adjacent rotors on that side through which the bracket passes, an angle $a$ can be provided between the rotor axes as shown in Fig. 20 in order to decrease the gap on the effective side to the value $l$ $(l-d\ tg\ a)$, $d$ being taken as the diameter of the rotor.

Figure 22:
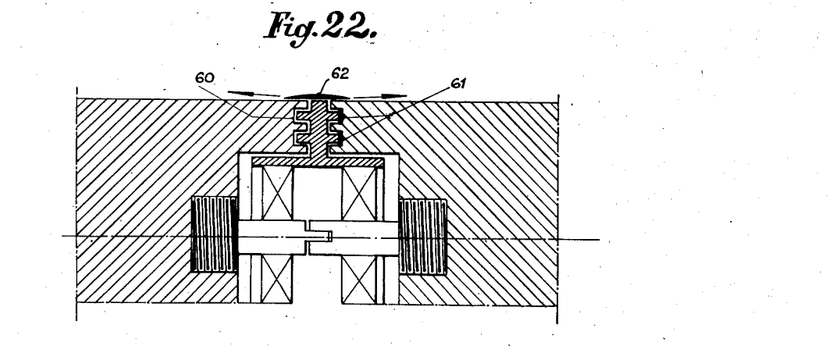

In order to decrease the leakage between the rotors and the fixed portions it is also possible, as shown in Fig. 22, to arrange one or several baffles or labyrinths 60, fluid-tightening members 61, fixed butt-straps 62 which not only make for a better fluid-tightness provided the clearance is small or nil but also and above all will check radial leakage, same being highly detrimental to the flow and involving unduly high rotor tangential speeds; eventually, said butt-straps can be wider than the distance between the rotors; the only condition is that their own width shall remain below the limit at which shedding begins. It is to be remarked that the example given in Fig. 22 is not limitary. Such an arrangement can also be applied for instance to the case of non-coaxial and non-cylindrical rotors, to airplane wings, lift-increasing flaps, ailerons, rudders, lift-generating elements of all kinds, ship and submarine rudders, etc., as well as to the lining of conduits: channels, diffusers and particularly wind-tunnel diffusers, as well as to propeller-like apparatus and turbo-machines: propellers, fans, wind-machines, turbines, etc.

Finally, as mentioned hereinbefore, this invention contemplates the combination of wind- or water-slots with the movable wall systems.

Figure 23:
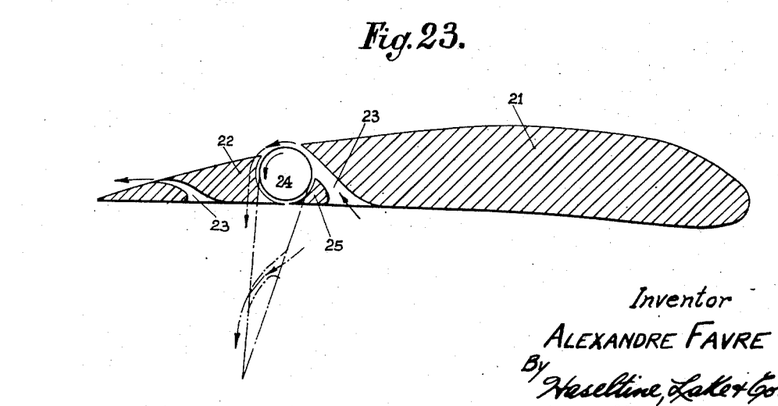
Figure 23 is a cross sectional view of an airplane wing fitted with a lift-increasing flap.

Thus, for instance, an airplane lift-increasing flap 22 can be provided (Fig. 23) with an auxiliary slot 23 located below the movable wall 24, or with several slots that open at the convex, straight or concave upper side of the flap. Contingently, one or several auxiliary flaps 22 can be articulated for the purpose of modifying the deflection and the area of the lift-increasing flap; the position of flap 22 can also be altered in order to increase the wing area.

Figure 14:
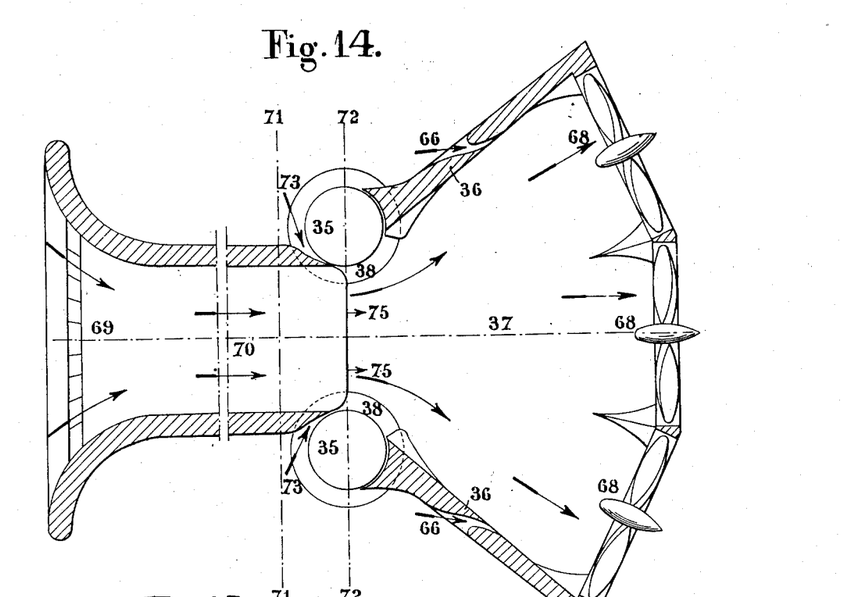
Figures 14 and 15 are cross sectional views taken on lines XIII—XIII and XIV—XIV in Fig. 12.

The said arrangement can be applied notably to ailerons, controls, deflectors, rudders, sails, etc., to all kinds of air or sea lift-generating elements, to propeller-like apparatus: fans, blowers, autogyros, gyroplanes, propellers, wind-machines, turbines, etc., as well as to the various vehicles: rail and road motor cars, ships, floats, submarines, etc. It can be applied to automobiles as shown in Fig. 17, as the slots 65 provided below the rotor; to wind tunnels as shown in Figs. 13 and 14, as the slots 66 provided eventually to improve the flow below the rotors.

For the sake of simplicity one can be led to provide the movable walls only over a portion of the periphery of the obstacle, apparatus or canalization, the greatest liability to shedding thus being focalized in those areas. In that case fixed walls are retained in the path of the fluid stream. It may be advantageous to provide slots through such walls in order to avoid the danger of shedding.

Such an application can be contemplated wherever movable walls are provided, for instance in airplane wing and fuselage fixed walls, guideplates, engine fairings, deflectors, controls, empennages, flaps, ailerons, etc.; fixed walls of peripheral or central casings in propeller-like apparatus, channel bottom fixed walls, fixed walls of rail and road motor vehicles (slots such as 67 in Fig. 17), ships, floats, etc., fixed walls in various kinds of diffusers, etc.

It can also be contemplated to apply such slots to the diffuser of a wind tunnel provided with movable walls in combination with slots upstream and downstream of the movable walls.

The example of a wind tunnel with movable walls is as follows.

Figure 15:
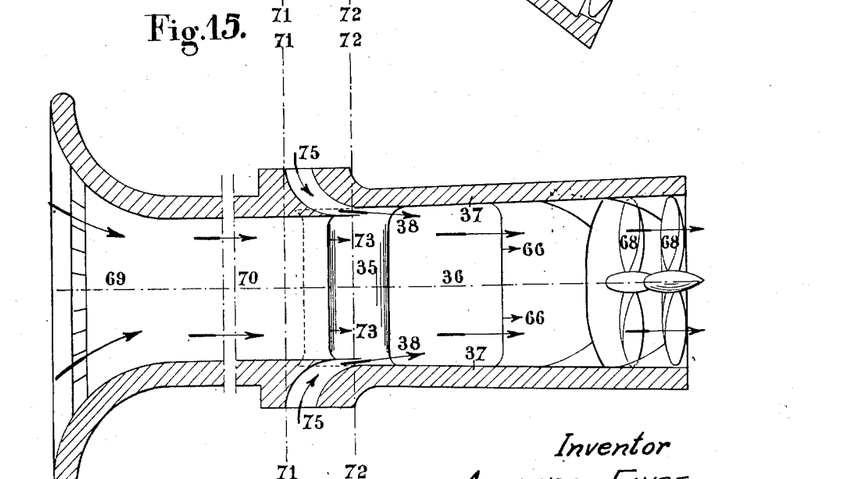

In the wind tunnel illustrated in Figs. 13 to 15 the three blowers 68 suck air through the diffuser and force it into the open. The air enters the collector 69, acquires its working speed in the test channel 70. The kinetic energy must thereafter be recovered by reconversion into pressure. The diffuser starts in section 71 with the usual angle of about 7°, after which the horizontal angle of aperture becomes very considerable in section 72 where it attains 90°, this resulting in a very considerable increase in section which normally would lead to shedding of the flow. However, the rolls 35 rotated in the direction of the flow at a suitable speed cancel the relative speed and check friction and shedding; the fluid follows the walls 36 of the diffuser and flows out at reduced speed through the outlets of blowers 68.

Slots 73 provided upstream of the rotors allow renewal of the boundary layers ahead of the latter to facilitate the effect of the same. Contingently, slots 66 located downstream of the movable walls will allow a still better flow.

Such marginal vortices as could escape at the joints between the rotary rolls and the top and bottom fixed walls 37 of the wind channel are checked by the equipment of said rolls with rotary discs 38 transitioned progressively.

The top and bottom fixed walls 37 cannot be designed for very high positive pressure gradients; consequently, their angle of aperture is small or nil, or even slightly convergent; since the pressure gradient all along the walls, in spite of these precautions, can reach medium values as a result of the very considerable horizontal spreading, it may be necessary to provide slots 75 through the said fixed walls 37 in order to avoid shedding phenomena.

Shedding and turbulence then are completely suppressed, and the wind tunnel reaches a very high efficiency in spite of its great compactness as compared to conventional wind tunnels. The dimension of the test stream parallel to the rotors can be larger than the dimension at right angles thereto without an increase in the length and width.

What I claim as my invention and desire to secure by Letters Patent is:

1. An airplane wing equipped with an articulated lift-increasing flap, in combination with a driven rotary roll inserted between the wing and the flap and whose axis coincides with the axis of articulation of the flap to the wing, the surface of said roll projecting slightly above the upper surface of the flap.

2. An airplane wing equipped with an articulated lift-increasing flap, in combination with a driven rotary roll inserted between the wing and the flap and whose axis coincides with the axis of articulation of the flap to the wing, the surface of said roll projecting slightly above the upper surface of the flap, and with a slot provided in the wing and opening at its lower end at some distance upstream of the roll and having its upper end flush with said roll.

ALEXANDRE FAVRE.

REFERENCES CITED

The following references are of record in the file of this patent:

UNITED STATES PATENTS

| Number | Name | Date |
|---|---|---|
| 1,714,609 | Massey | May 28, 1929 |
| 1,875,276 | Steigert | Aug. 30, 1932 |
| 1,879,594 | Trey | Sept. 27, 1932 |
| 2,344,515 | Massey | Mar. 21, 1944 |

FOREIGN PATENTS

| Number | Country | Date |
|---|---|---|
| 219,664 | Great Britain | Oct. 27, 1925 |
| 550,713 | Great Britain | Jan. 20, 1943 |